Figure 1:
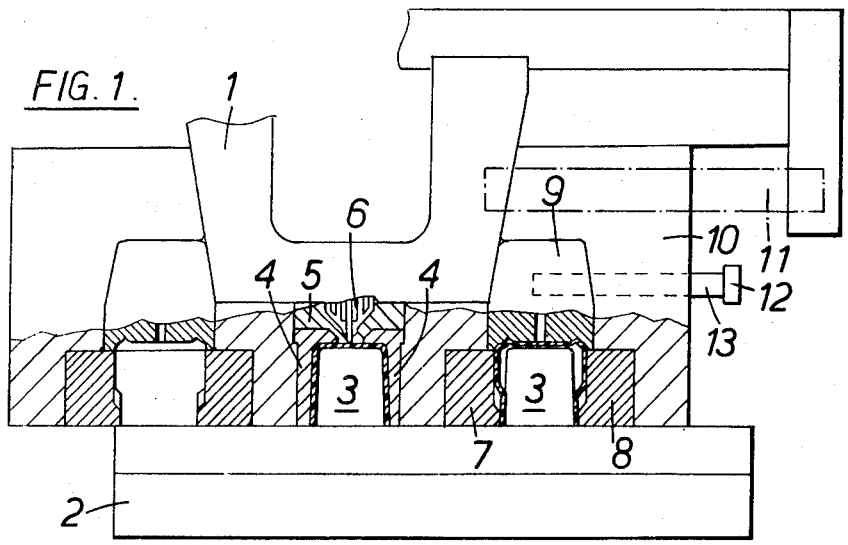
Figure 2:
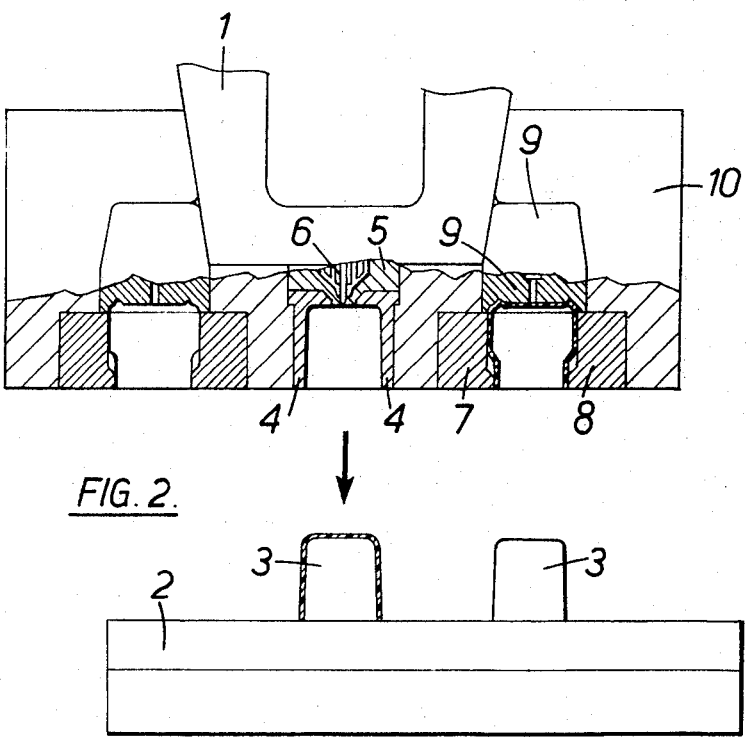

United States Patent [19]

Majors et al.

[11] 3,870,448
[45] Mar. 11, 1975

[54] MACHINES FOR MOULDING HOLLOW BODIES FROM SYNTHETIC RESIN

[75] Inventors: Eric Desmond Thomas Majors, Chichester; John Kenneth Davey, Clanfield, both of England

[73] Assignee: Cope Allman Plastics Limited, Farlington, Portsmouth, Hampshire, England

[22] Filed: Feb. 12, 1974

[21] Appl. No.: 441,871

[52] U.S. Cl. .............. 425/242 B, 425/DIG. 205, 425/DIG. 209, 425/DIG. 232, 425/DIG. 233, 425/441

[51] Int. Cl. ........................................ B29d 23/03

[58] Field of Search .......... 425/DIG. 205, DIG. 209, 425/DIG. 233, DIG. 232, 242 B, 324 B, 387 B, 441

[56] References Cited
UNITED STATES PATENTS

| | | | |
|---|---|---|---|
| 2,850,766 | 9/1958 | Press et al. | 425/441 X |
| 3,183,552 | 5/1965 | Farkas | 425/DIG. 209 |
| 3,640,671 | 2/1972 | Reilly | 425/441 X |
| 3,809,517 | 5/1974 | Schneider | 425/DIG. 205 |

*Primary Examiner*—Richard B. Lazarus
*Attorney, Agent, or Firm*—Scrivener Parker Scrivener and Clarke

[57] ABSTRACT

In a tool for moulding hollow articles from synthetic resin by a combined injection and blow moulding process, for example of the kind shown in U.S. Pat. No. 3,183,552 of Farkas or U.S. Pat. No. 3,492,690 of Coldring et al., the blow mould cavity is defined by a mould having three sections, two of which define between them the cavity forming the main body of the article to be moulded whilst the third forms the base of the article, and when the mould is to be opened one of the first two sections remains fixed whilst the other of these sections moves laterally, that is to say, in a direction perpendicular to the axis of the core, whereas the third section moves a lesser distance in the same direction, for example through a lost-motion connection with the means that move the other moving section.

2 Claims, 4 Drawing Figures

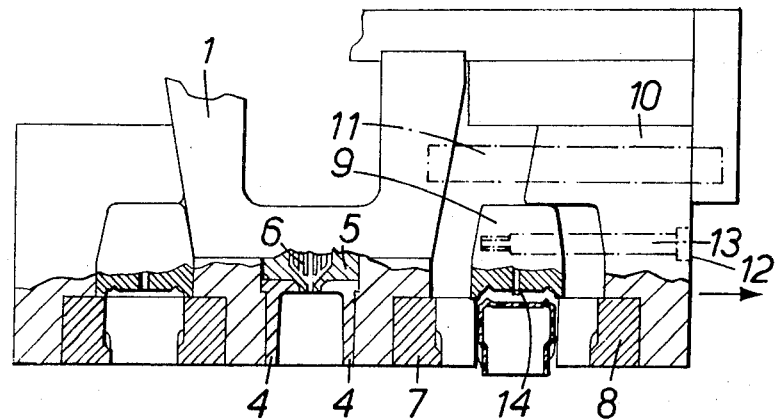
FIG. 3.
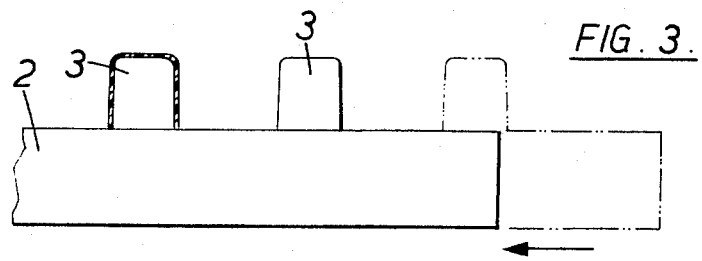
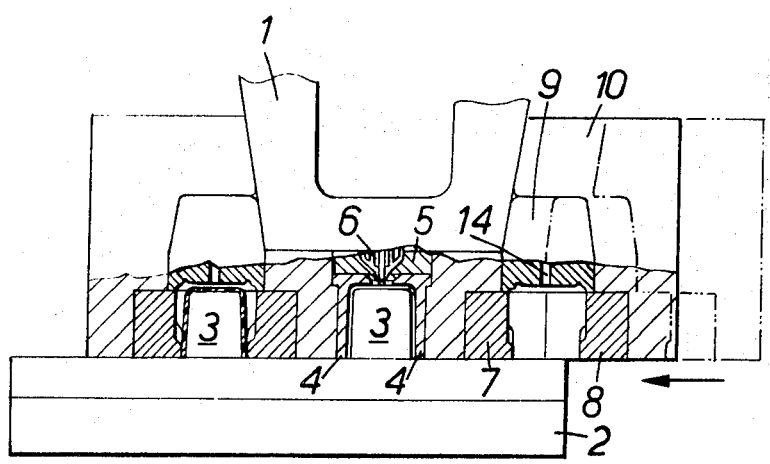
FIG. 4.
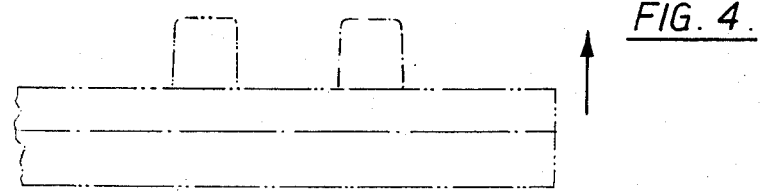

MACHINES FOR MOULDING HOLLOW BODIES FROM SYNTHETIC RESIN

This invention relates to machines for moulding hollow bodies of synthetic resin by a combined injection and blowing process in which a parison is first formed by injection moulding in a mould comprising a core and an injection cavity, and then the parison, still on the core, is withdrawn from the injection cavity and transferred to a blow cavity where a gas (usually air) is admitted to the interior of the still soft parison through the core to expand it to fill the blow mould and from the final shape of the body. This process is used for example to produce high quality jars and bottles. An example of it is described in U.S. Pat. No. 3,183,552 of Francis Farkas (and its U.S. Pat. No. Re26,265) and a further development is shown in U.S. Pat. No. 3,492,690 of Goldring et al., assignors to Cope Allman International Limited.

The body of the finished container is generally broader than the neck and so it is necessary for the block in which the blow mould cavity is formed to be of split construction and to open after the blowing step, in order to allow the container to be withdrawn. In the processes described in the patent specifications mentioned above the blow mould is in two halves which move simultaneously forwards and apart along mutually divergent paths as the core is withdrawn axially. It is also known (for example in U.S. Pat. No. 3,116,877 of E. P. Moslo) for the one half to remain fixed whilst the other moves away from it in a direction perpendicular to the parting plane. The core, carrying the container, moves a shorter distance in the same direction and is then withdrawn axially or moved aside laterally in a direction parallel to the parting plane.

Where the container which is to be moulded has a recessed base, straightforward lateral splitting of the mould, i.e., separation of the two halves of a simple two-part mould in a direction perpendicular to the plane of the split between them, is no longer possible. It has been proposed in U.S. Pat. No. 3,480,994 of E. P. Moslo to add a third part to the mould, this part forming the base of the container and being moved away in a direction parallel to the plane of the split as the other two parts of the mould move laterally apart. In British Pat. No. 1,130,648 of Shell International Research there is disclosed another solution to the same problem in which each of the main mould halves has a subsidiary slidable portion forming half of the recessed portion of the container, and these slidable portions at first remain stationary and engaging the recess while the main mould portions move apart in opposite directions. However that layout is intended for use in an extrusion/blow moulding process, in which the parison that is placed in the blow mould is in the form of an extruded length of plastics tube, which makes it virtually essential for both main mould halves to move.

The aim of the present invention is to provide a tool for injection/blow moulding of the general kind set out in the opening paragraph above, in which the blow mould opens, after blowing, in a relatively simple manner without its parts projecting forwards of the parting plane between the two main components of the tool and without interfering with the withdrawal of the core as the tool opens.

According to the invention it is proposed that the blow mould should comprise three sections, two of which between them define the cavity forming the main body of the article to be moulded whilst the third forms the base of the article, and to open the mould one of the first two sections remains stationary, whilst the other of these sections moves laterally, that is to say, in a direction perpendicular to the axis of the core, whereas the third section moves a lesser distance in the same direction.

In this way, after withdrawal of the core, the mould can open in a wholly lateral direction and the formed article, if it has a recessed base or a base of almost any form other than flat, can be carried laterally with the third section of the mould and then drop clear by gravity, or by the action of an ejector pin or an air blast.

According to a further feature of the invention the movement of both the movable sections of the mould is achieved by the same means, for example a pneumatic ram, these two sections being connected together through a lost-motion linkage so that first only one moves and then, after the lost motion has been taken up, they both move together.

It will be appreciated that the mould may be in any attitude, vertical, horizontal or inclined and when we use this term 'lateral' this is with respect to the axis of the core, which is not necessarily horizontal. Moving the blow mould sections wholly laterally instead of, moving them forward along divergent paths (as shown in U.S. Pat. 3,183,552), allows them to remain wholly behind the parting plane of the mould throughout the cycle, and this can lead to simplification of the construction of the tool.

An example of a tool in accordance with the invention will now be described with reference to the accompanying drawings, of which FIGS. 1 to 4 are all partly sectioned views, at different stages in the moulding cycle, of the tool looking in a direction perpendicular to the plane that contains the direction of movement of the movable sections of the blow mould and also contains the direction of opening movement of the core-carrying block of the tool.

The tool comprises basically a fixed block 1 carrying the injection and blow moulds and a movable block 2 carrying the cores 3 on which the parisons are formed and transferred from the injection mould to one or the other of the blow moulds. As in the layouts described in U.S. Pat. No. 3,183,552 and British Pat. No. 1,183,327, the mould block has an injection mould flanked by two blow moulds. The injection mould is wholly stationary and is formed by two replaceable inserts 4 defining between them the outer surface of the injection mould cavity, and an insert 5 receiving a nozzle 6 for injecting molten plastics material into the cavity. The block 2 is movable towrads and away from the block 1 in a direction perpendicular to the plane of the mating surfaces of the two blocks 1 and 2, and is also movable laterally, in the plane of the drawings, when the cores 3 are clear of the mould cavities.

Each blow mould cavity (for simplicity only the right-hand one is illustrated in detail) is defined by a fixed main section 7, a moving main section 8 and a moving base section 9. The two moving sections are both guided for lateral movement, parallel to the plane of the mating surfaces of the two blocks 1 and 2, the main section 8 being mounted in a carrier 10 guided on a slide 11.

The tool shown is designed to be mounted between the platens of a standard commercially available injection moulding machine. Starting with the tool closed, as shown in FIG. 1, i.e. with block 2 in face-to-face engagement with the block 1 and with one of the cores 3 in the injection mould cavity and the other in the right-hand blow mould cavity, molten plastics material is admitted through the nozzle 6 to the injection mould, while at the same time air is admitted through the right-hand core 3 to expand a parison previously formed on that core, to fill the blow mould and thereby form a finished container. Then the platen of the machine that carries the block 2 is retracted, moving this block to the position shown in FIG. 2. A pneumatic cylinder (not shown) then displaces the block 2 to the left, to the position shown in FIG. 3 to align the right-hand core 3, now empty, with the injection mould and to align the left-hand core 3, carrying a newly moulded parison, with the left-hand blow mould.

In the meantime a further pneumatic ram (not shown) moves the carrier 10 with the movable main section 8 of the right-hand blow mould to the right, away from the newly moulded container in that mould. After a predetermined travel of the carrier 10 the head 12 of a pin 13, slidable in the bore of the carrier and engaging the third mould section 9, is picked up by the carrier and then on continued movement of the carrier the section 9 is also moved to the right as shown in FIG. 3. The blown container is carried with this base section to which it is keyed by its own re-entrant or recessed bottom surface, and when it is clear of the left-hand section 7 of the mould, the container is ejected by a pneumatically operated ejector pin 14 on this base section, When the container has been given time to fall clear, the last-mentioned pneumatic ram reverses its motion, moving the carrier 10 to the left to close the right-hand blow mould. Then, or simultaneously with this movement is complete the movable platen of the moulding machine to advance the block 2 towards the block 1 as shown in FIG. 4, so that now the right-hand core is in the injection mould and the lefthand core is in the left-hand blow mould. The cycle is then repeated, except that now the blowing takes place in the left-hand instead of the right-hand blow mould. It will be understood that this mould opens in exactly the same way as the right-hand one, but to the left instead of to the right.

In a practical tool there may be several superimposed rows of injection moulds, each flanked by two blow moulds, in a known manner.

In a modification it would be possible to introduce a frictional or other connection between the base section 9 and the carrier 10 so that the base section moves with the carrier and the section 8 right from the start of the opening movement but then is restrained by a fixed stop after a predetermined travel, and thereafter the section 8 continues alone to the fully open position.

We claim:

1. A tool for moulding hollow articles, such as containers from thermoplastic synthetic resin material by a combined injection and blow molding process, said tool comprising first means defining an injection mold cavity having an axis, second means defining a blow mold cavity having an axis, said first and second means being disposed side by side with said axes mutually parallel, a first block supporting said first and second means, a second block, said blocks being movable relatively apart in a direction parallel to said axes, a core mounted on said second block, and extending parallel to said axes, said core being movable laterally relative to said cavities between a position in which it is aligned with said injection mold cavity and a position in which it is aligned with said blow mold cavity, the invention lying in the feature that said second means comprise three mold sections, namely, a first mold section which is fixed in relation to said first block, and defines one side of said blow mold cavity, a second mold section defining the other side of said blow mold cavity, said second mold section being movable towards and away from said first section in a direction perpendicular to said axes, a third section defining a base of said cavity, said third section being movable with respect to said first section in the same direction as said second section, means for moving said second section through a predetermined distance in said direction away from a closed position, and means for simultaneously moving said third section a lesser distance in the same direction.

2. The tool set forth in claim 1 wherein said means for moving said third section comprise a lost-motion connection with said means for moving said second section.

* * * * *